Nov. 4, 1958 M. LODEWICK ET AL 2,858,733
SPECTACLE RETAINING DEVICE
Filed Nov. 21, 1955
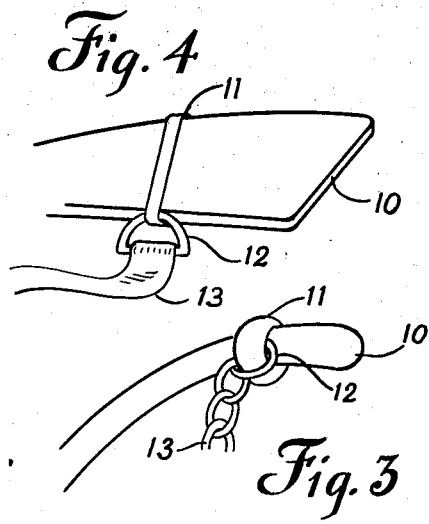
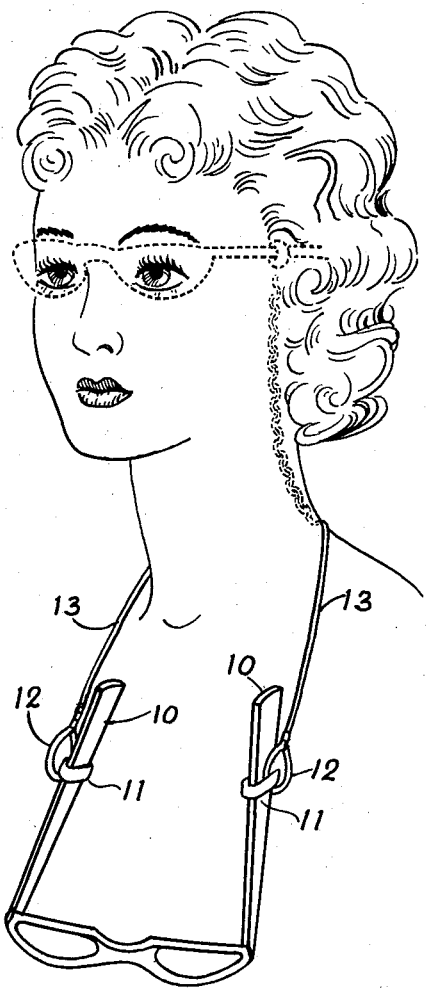
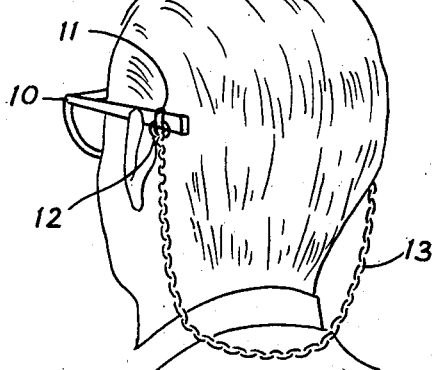
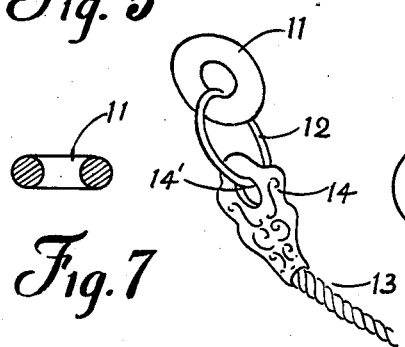
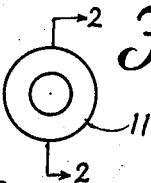
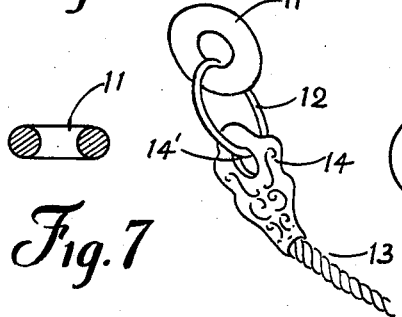
INVENTOR.
Madeleine Lodewick &
Mildred Lodewick
BY
L. S. Saulsbury
Attorney

United States Patent Office 2,858,733
Patented Nov. 4, 1958

2,858,733

SPECTACLE RETAINING DEVICE

Madeleine Lodewick and Mildred Lodewick,
New York, N. Y.

Application November 21, 1955, Serial No. 548,063

2 Claims. (Cl. 88—51)

This invention relates to improvements in retainers for spectacles or other glasses having temple bars, and more particularly to an improved device so equipped and of such proportions as to enable the wearer to quickly and easily apply the glasses when needed for use while providing for their retention between periods of usage in a position that will be comfortable to the wearer, and of simple construction without protrusions or impedimentia to catch onto and disturb the clothing.

A special and important objective is attained in that the device can grip the temple bars at any preferred location which provides that it can be placed in front of the ears, eliminating any disturbance of the hairdress; or placed behind the ears may serve to restrain the glasses from slipping forward when one is continually looking down on their work.

Another object of the invention is to provide a retaining means that has no metal contacting the skin, eliminating the possibility of skin eruption which constant friction could cause or the discomfort to those allergic to metal.

Another object is to provide a device that is inconspicuous and of such minimum bulk that it is not necessary to remove it from the glasses in order to put them in the eyeglass case; which would be impossible if there were bulky or protruding parts.

The foregoing and numerous other objects will be best understood from the following description of exemplifications thereof, reference being had to the accompanying drawing, wherein:

Figure 1 is a perspective view showing one embodiment of the device attached to the eyeglasses which reposes on the chest of the wearer, with its position for active use indicated by a dotted line, showing the device positioned on the temple bars of the glasses at a distance from the ends.

Figure 2 shows the device applied near the end of the temple bars bringing it behind the ears of the wearer.

Figure 3 shows the device applied to a narrow temple bar wherein the expandable rubber ring is shown to snugly grip it.

Figure 4 shows the device applied to a wide temple bar wherein the same rubber ring is shown expanded.

Figure 5 shows a further embodiment of the invention and employing a large inelastic ring and ferrule to secure the rubber elastic ring to the cord.

Figure 6 shows a plan view of the rubber retention ring.

Figure 7 is a sectional view of the retention ring at point number 2—2 in Figure 6.

Referring now to Figure 1, numeral 10 indicates the temple bars of a pair of eyeglasses onto which has been rolled annular expansible or elastic pure gum rubber rings 11 which are connected by means of oversize inelastic rings 12, to a length of cord, ribbon or other flexible material or member 13 surrounding the neck, to permit the eyeglasses to repose on the chest while awaiting active use.

In Figure 3 the expandable rubber ring 11 is shown loosely connected to a circular non-expansible or inelastic ring 12 which forms a part of the flexible neck chain 13.

Figure 4 shows the same expansible or elastic rubber ring 11 rolled onto and threaded over a wide temple bar 10 and connected to the flexible tie element 13 which surrounds the neck, by means of a shaped solid inelastic ring 12 which suspends the ribbon 13 without gathering it, as a circular solid ring would.

Figures 5 and 6 show the rubber ring 11 attached by means of an oblong non-expansible or inelastic ring 12 loosely to a ferrule or attaching means 14 with an eye opening 14' and which encloses the ends of the tie-element 13.

The expansible or inelastic rubber rings 11 are non-sleeve in form or substantially circular in radial cross section so that they may be easily rolled upon being threaded over the temple bars and of sufficient resiliency to retain their shape yet distortable for threading over the free end of the temple bar and adapted to resiliently grip the temple bars at any position along the length thereof. Each rubber ring has a contracted diameter less than the width of the end of the temple bar and an axial length and radial size coordinating with each other and such that the rubber ring may be rolled along the bar to facilitate the threading and positioning of rubber rings.

The inelastic rings or loops 12 in each instance have a substantially larger diameter than the radial cross-section of the elastic ring and have smooth surfaces. The inelastic rings 12 are of formed metal or plastic.

These inelastic rings or loops 12 are connected in a free and loose manner to the cord or chain 13 by attaching means such as a chain link in Fig. 3, a ribbon loop in Fig. 4, the ferrule 14 in Fig. 5 with its large eye opening 14' and so as to permit the angular deflection of the inelastic ring or loops 12 relative to the cord, flexible member 13, ribbon or chain to reduce the tendency for the cord to become entangled with itself upon the rubber ring being rolled over the temple bar and so that the rubber ring can be freely rolled along the temple bar to any position thereon and without appreciable obstruction from the inelastic rings, or the flexible member and without the entanglement of the flexible member with the rubber ring.

Having thus set forth the nature of our invention, we claim:

1. A device for retaining eyeglasses including reading glasses having temple bars of various shapes and widths, comprising a flexible member long enough to loosely encircle the back of the user's neck and hang down in front of the user's body, an attaching means at each end of said flexible member, a pair of annular elastic rubber rings, each ring being substantially circular in radial cross-section and of sufficient resiliency to retain its shape yet being distortable for threading over the free end of the temple bar and adapted to resiliently grip the temple bar at any point along the length thereof, said each rubber ring having an inside diameter less than the width of the end of the temple bar and of an axial length and radial size such that the rubber ring may be rolled to facilitate the threading of the ring upon the temple bar, and a pair of smooth inelastic rings, each inelastic ring passing loosely through one of said rubber rings and loosely connected to said attaching means, each of said inelastic rings having a substantially larger diameter than the radial cross section of the elastic rings whereby to permit substantially free rolling movement of the rubber ring along the temple bar without appreciable obstruction from the inelastic ring, and flexible member.

2. A device for retaining eyeglasses including reading glasses having temple bars of various shapes and widths, comprising a flexible member long enough to loosely encircle the back of the user's neck and hang down in front of the user's body, a ferrule clamped to each end of said flexible member, said ferrule having a substantial large eye opening, a pair of elastic rubber rings, each elastic ring being substantially circular in radial cross-section and of sufficient resiliency to retain its shape yet distortable for threading over the free end of the temple bar and adapted to resiliently grip the temple bar at any position along the length of the temple bars, said each rubber ring having an inside diameter less than the width of the end of the temple bar and of an axial length and radial size coordinating with each other so that the rubber ring may be rolled to facilitate the threading of the ring upon the temple bar and the positioning of the same therealong and a pair of smooth inelastic rings, each inelastic ring passing loosely through one of said rubber rings and loosely through the eye opening of the ferrule, each inelastic ring having a substantially larger diameter than the radial cross-section of the elastic ring, whereby to permit substantially free rolling movement of the rubber ring along the temple bar and without the flexible member becoming entangled with the rubber ring.

References Cited in the file of this patent

UNITED STATES PATENTS

| | | |
|---|---|---|
| 2,648,255 | Pendelton | Aug. 11, 1953 |
| 2,649,020 | Wheeler | Aug. 18, 1953 |